(No Model.)
T. J. VOLLKOMMER.
DISH CLEANER.
No. 547,307. Patented Oct. 1, 1895.
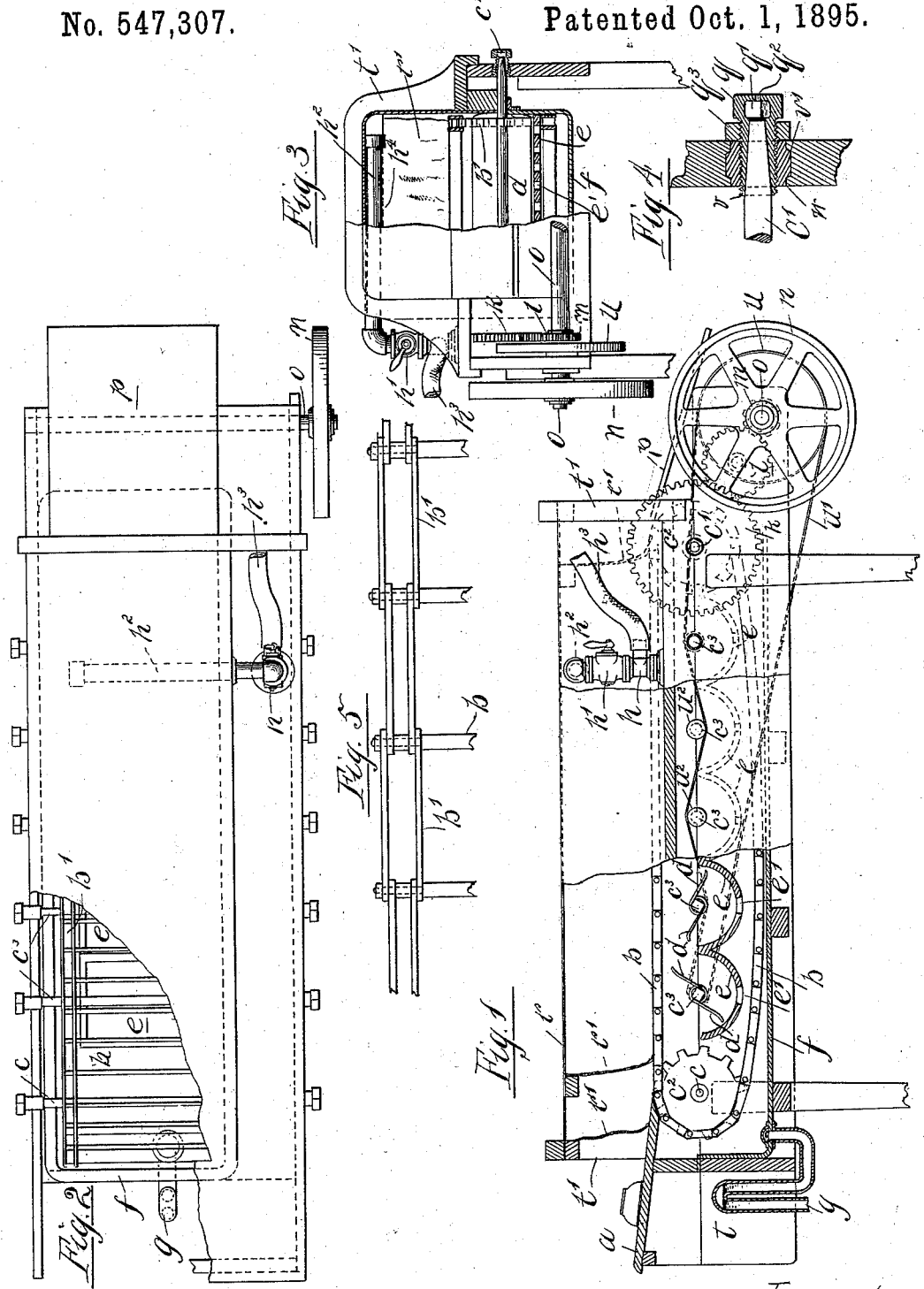
Witnesses
Clinton Hamlink
John W. Adams
Inventor
Theodore J. Vollkommer
by Dayton, Poole, Brown
his Attorneys.
ANDREW B.GRAHAM. PHOTO-LITHO. WASHINGTON, D.C.

UNITED STATES PATENT OFFICE.

THEODORE J. VOLLKOMMER, OF CHICAGO, ILLINOIS.

DISH-CLEANER.

SPECIFICATION forming part of Letters Patent No. 547,307, dated October 1, 1895.

Application filed January 22, 1894. Serial No. 497,732. (No model.)

*To all whom it may concern:*

Be it known that I, THEODORE J. VOLLKOMMER, of Chicago, in the county of Cook and State of Illinois, have invented certain new and useful Improvements in Dish-Washing Apparatus; and I do hereby declare that the following is a full, clear, and exact description thereof, reference being had to the accompanying drawings, and to the letters of reference marked thereon, which form a part of this specification.

This invention relates to that class of dish-washing machines embodying a traveling carriage or belt upon which the dishes are supported and carried past a series of splashers, jets, or other means for cleansing them, and among the objects of the invention are to provide an apparatus capable of rapidly and efficiently cleansing dishes of any ordinary size or shape, adapted for continuous operation and not likely to get out of repair with any reasonable usage.

The invention consists in the matters hereinafter described, and particularly pointed out in the appended claims.

In the accompanying drawings, Figure 1 is a side elevation, with parts in section, of a machine embodying my invention. Fig. 2 is a top plan view with part of the housing or covering broken away to expose parts beneath. Fig. 3 is a rear end elevation with parts in section. Fig. 4 is a sectional detail of one of the shaft-bearings. Fig. 5 is a fragmentary detail of a portion of the slatted carrier-belt.

To now describe said drawings: Upon any suitable frame or table $t$ is supported a water-tight tank or trough $f$, preferably of metal, and provided with an outlet-pipe $g$, suitably arranged to retain the water at a desired level within the tank $f$, in this instance in the form of a trap or water-gage, as shown in Fig. 1.

Journaled in suitable bearings at opposite ends of the tank or basin $f$ are shafts $c\ c'$, each carrying a sprocket-wheel $c^2 c^2$, arranged at opposite sides of the tank $f$ and supporting an endless traveling belt $b$, of any suitable reticulated construction, but in this instance, and as preferably made, in the form of a transversely slatted or grated carrier, the slats of which are secured at either end to suitable strips or belts $b'\ b'$. The purpose of this belt being to support and carry the dishes to be washed past the splashers and rinsing devices, such a transversely-slatted belt will be found a most desirable construction, as affording unobstructed access of the water to the dishes during the greater part of the time, as will hereinafter more fully appear.

Intermediate of the shafts $c\ c'$ are arranged a series of shafts $c^3\ c^3\ c^3$, suitably journaled above the tank, as shown, said shafts being square in cross-section and each provided with a plurality of splashers $d\ d$, whereby, by a rotation of the shafts, water will be carried up and splashed through the upper lap of the endless carrier $b$ and against the dishes carried thereon. Each splasher is constructed of a sheet-metal plate rigidly secured at one margin to the rectangular shaft $c^3$ and curved at its outer end, so as to form a bucket or concave adapted to scoop up a portion of the water as it rotates. These blades will be preferably arranged in pairs, extending oppositely from the shaft, as shown, and in order that they may more effectually scoop up the water and dash it against the dishes a semicircular-shaped trough or guide $e$ is arranged beneath and concentric to the path of rotation of each pair. These troughs are suitably perforated to permit free access of the water from beneath, as seen at $e'$, and are so supported as to be above and out of the way of the lower lap of the endless carrier $b$.

Mounted on the frame $t$ at one side and toward the rear end thereof is a vertical supply-pipe $h$, provided with a valve $h'$, and extending horizontally therefrom, so as to overhang the belt $b$, is a perforated pipe $h^2$, from the downwardly-directed perforations $h^4$ of which the water is directed in jets or sprays upon the dishes. The supply-pipe $h$ is connected by a pipe $h^3$ with any suitable source of water-supply.

Means for actuating the traveling belt and the splashers are provided as follows: A main driving-shaft $o$, carrying a belt-pulley $n$, is mounted transversely in the back end of the frame $t$, as shown in Fig. 1, and driven from any suitable source of power. Mounted on the shaft $o$ is a pinion $m$, intermeshing with an intermediate gear $l$, which latter actuates a gear $k$, keyed upon the sprocket-wheel shaft $c'$, as shown in Figs. 1 and 3, thus positively actuating the belt $b$. In order to actuate the splashers $k$, a second belt-pulley $u$ is mounted on the driving-shaft $o$, and from this pulley a belt $u'$ is trained alternately above and beneath friction-pulleys $u^2 u^2 u^2$, mounted on the shaft $c^3 c^3 c^3$, carrying said splashers. At the front of the frame $t$ is secured a rearwardly-inclined feed-table $a$, its inner end extending over the front end of the traveling carrier $b$, and being beveled or chamfered on its under side, as shown in Fig. 1, to bring its upper surface in close proximity to said carrier. A second table $p$ is secured to the frame at its rear end, onto which the cleansed dishes are discharged from the belt $b$. Standards $t' t'$ rise from the frame $t$ at the ends to support a housing $r$ above the tank $f$. As the purpose of this housing is merely to prevent water splashing on the floor, it may consist of a cover of oiled cloth or other suitable tight material stretched or supported between the standards $t' t'$ in the form of an open-ended canopy, as shown. To prevent the splashing of water through the ends of this housing, curtains $r'$, of some light textile or pliable material, are suspended near each end, the lower ends of said curtains resting in contact with the belt $b$, or nearly so, the same being of such light material as not to endanger the sweeping of the articles of crockery from the feeding-table $a$ or the belt.

In Fig. 4 is illustrated a shaft-bearing particularly designed to fulfill the requirements of an apparatus such as herein described—that is to say, a bearing so arranged as to prevent the collection of water therein, and which may be adjusted as required from the exterior of the tank—said bearing also embodying the feature of a self-lubricating bearing, as will presently appear.

The shaft $c'$ is tapered at the ends where it is journaled in the bearing-boxes $v$, said boxes being correspondingly tapered to fit the shaft, whereby wear of the parts may be taken up or compensated by an endwise adjustment of the box. The exterior of the box is cylindric and provided upon its periphery with a screw-thread, which engages a nut or bushing $v'$, seated tightly in the aperture $w$, formed in the table or other object for the reception of the shaft-bearing. As shown, this bushing comprises a metal ring $v'$, cast within the chamfered aperture $w$ of the frame $t$, threaded interiorly to receive the bearing-box $v$. The bearing-box is provided at its outer end with an enlargement or head $q$, within which is formed a chamber $q'$, communicating with but of greater diameter than the outer ends of the bore of the box, and the head $q$ is provided centrally or in a plane with the axial center of the bearing-box with a small opening $q^2$, through which oil may be supplied to the chamber $q'$ to above the level of the lower part of the shaft $c'$, the supply of lubricant to the shaft or bearing being thus dependent upon the requirements thereof, the oil entering the bearing at the smaller end of the bore and being distributed throughout the length thereof by gravity and by the revolution of the shaft. The bearing-box, after adjustment within its bushing, may be locked thereto by a jam-nut $q^3$, or usual devices.

Thus constructed and arranged the operation of the machine is as follows: The machine having been connected through the main shaft and belt-wheel thereon with any suitable source of power, or, if preferred, driven by hand, the valve in the supply-pipe $h$ is turned to admit water supplied from any suitable source and preferably hot. When sufficient water has been admitted to fill the tank to the height permitted by the water-gage, the dishes are fed over the table $a$ onto the belt $b$. The splashers $d d$, being driven with considerable speed, will, by reason of their transverse arrangement, scoop up and dash the water through the slatted belt and against the dishes carried thereon, the relative narrowness of the slats and the transverse arrangement thereof permitting the water to impinge upon the dishes during the greater part of the time with its full effect. As the dishes travel backward over the series of splashers, they will be thoroughly cleansed, and passing beneath the horizontally-arranged inlet-pipe will receive a final rinsing with pure hot water issuing in jets therefrom, after which they will be passed out onto the delivery-table $p$. When used with hot water in the manner described, the dishes will, by reason of their relatively slow passage over the carrier-belt and the final rinsing with hot water, be so heated as to quickly evaporate the moisture adhering to their surfaces as soon as they have reached the outer air, thus rendering unnecessary any wiping and leaving the dishes in the cleanest possible condition. It is to be noted in this connection that the operation of the machine is continuous and may be carried on with great rapidity, several thousand dishes having been passed through my new apparatus in a single hour on repeated occasions. The use of the device, therefore, effects a great saving of time and labor and breakage, because the handling of the dishes is reduced to a minimum.

I claim as my invention—

1. A dish washing apparatus comprising a receptacle an endless carrier of intersticed form and a plurality of dashers arranged to discharge water upon and through said carrier, substantially as set forth.

2. A dish washing apparatus comprising a tank an endless traveling belt of intersticed construction, dashers located below the belt to discharge water therethrough, and a supply pipe located above and arranged to discharge water upon and through the lap of said belt, substantially as set forth.

3. The combination, with a dish washing apparatus comprising a tank, an endless traveling belt of intersticed form and a series of dashers arranged within the tank but beneath the upper lap of said belt, of a removable housing arranged above said belt and provided at either end with loosely hung curtains, substantially as and for the purpose set forth.

4. A dish washing apparatus comprising a tank, an endless traveling belt of intersticed construction arranged above said tank, a series of dasher blades arranged beneath the upper lap of said belt and concentric guards arranged beneath said blades, and a supply pipe arranged to discharge upon the upper lap of said belt, substantially as set forth.

5. A dish washing apparatus comprising a tank, an endless traveling belt of intersticed construction arranged above said tank, a series of dasher blades arranged beneath the upper lap of said belt and concentric guide plates or guards arranged beneath said blades, a supply pipe arranged to discharge upon the upper lap of said belt, and a water gage or trap arranged to retain the water at a desired level in the tank, substantially as described.

6. A dish washing apparatus comprising a tank, an endless traveling belt of transversely slatted construction arranged above said tank, a series of dasher blades mounted on shafts arranged transversely beneath the upper lap of said belt, semicircular guide plates or guards arranged concentrically beneath said blades, a horizontally arranged supply pipe overhanging said belt, provided with downwardly directed perforations, and means for actuating said belt comprising a train of gears actuated from a main driven shaft, substantially as set forth.

7. A dish washing apparatus comprising a tank, an endless traveling belt of transversely slatted construction arranged above said tank, a series of dasher blades mounted on shafts arranged transversely beneath the upper lap of said belt, semicircular guide plates or guards arranged concentrically beneath said blades, a horizontally arranged supply pipe overhanging said belt, provided with downwardly directed perforations, means for actuating said traveling belt comprising a train of gears actuated from a main driven shaft, and means for actuating said dasher blades consisting of a belt trained alternately over and under friction pulleys mounted on the shafts carrying said blades and around a belt wheel mounted on the main shaft, substantially as and for the purpose specified.

In testimony that I claim the foregoing as my invention I affix my signature in presence of two witnesses.

THEODORE J. VOLLKOMMER.

Witnesses:
TAYLOR E. BROWN,
ALBERT H. GRAVES.